United States Patent Office 3,613,188
Patented Oct. 19, 1971

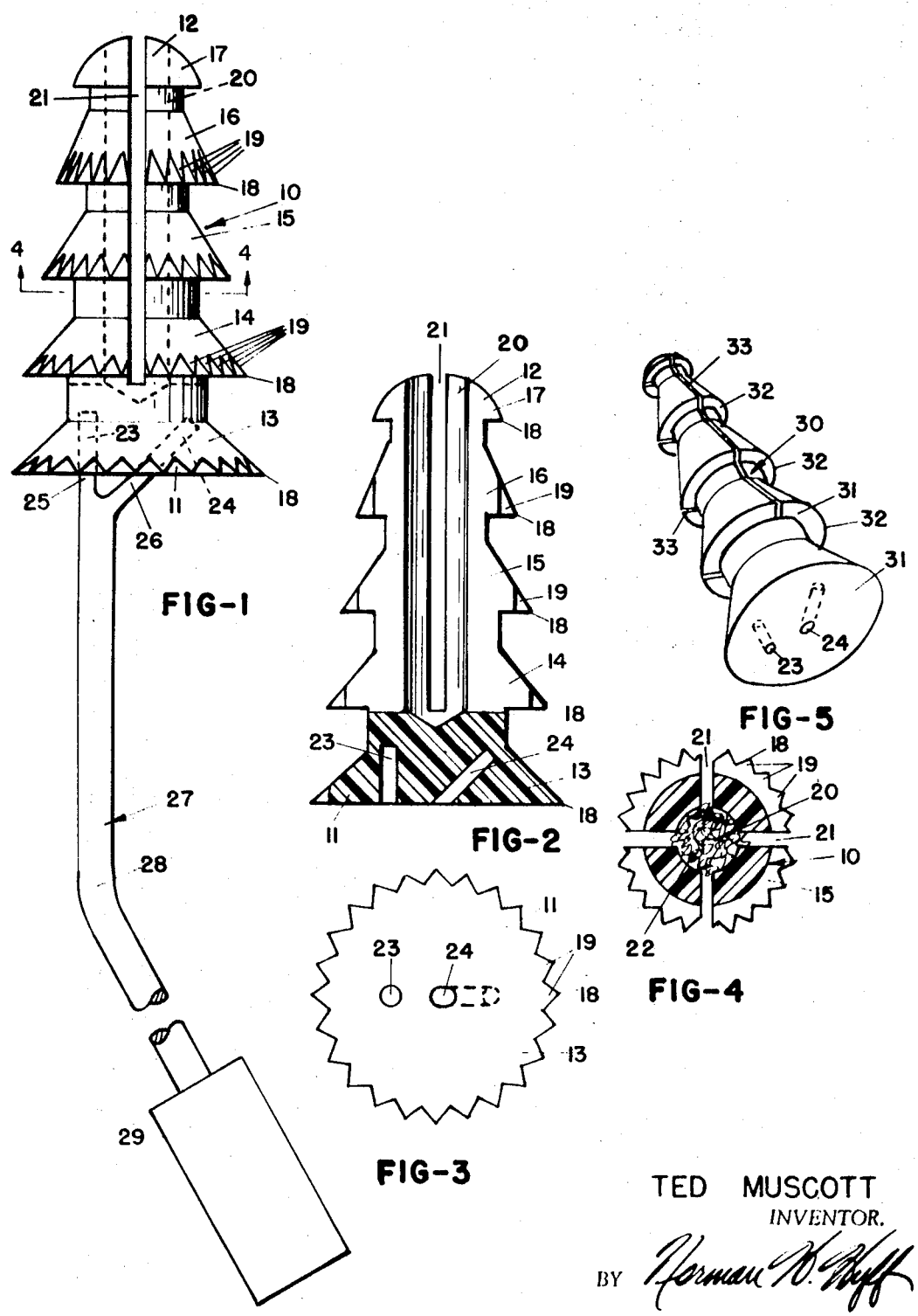

3,613,188
PLUG FOR OPENINGS IN CADAVERS
Ted Muscott, Box 315, Othello, Wash. 99334
Filed Feb. 24, 1969, Ser. No. 801,331
Int. Cl. A01n 1/00
U.S. Cl. 27—21
5 Claims

ABSTRACT OF THE DISCLOSURE

A tapered plug having plural annular series of anchors, a central bore containing an absorbent material and quadrilateral openings into the bore; the base or large end being circumferentially uninterrupted and impervious and having sockets adapted to cooperate with an applicating implement exposed at the base end.

My present invention is in the field of devices employed in embalming cadavers in preparation for burial and more particularly is a plug for stopping the natural body openings, i.e., the vaginal and/or anal openings, to prevent the escape of body fluids and pathogenic organisms therefrom.

Customarily, during the embalming of a cadaver, an embalming fluid is introduced into the arterial system of the body at a steady or pulsating pressure approximating the pressure developed by the human heart during life. Simultaneously, blood is discharged from the venous system so that the embalming fluid may enter and permeate the organic tissues of the body.

Under conditions of a natural death, there is ordinarily only a minimal seepage or leakage of fluid through the vaginal and/or anal openings, but when death occurs from means wherein the internal organs, arteries and veins have been cut and torn, the quantity of fluid which escapes from the abdominal cavity increases and may be supplemented by the embalming fluid and venous blood. This is nearly always the case after an autopsy has been performed wherein the abdominal organs have been excised or laid open for examination.

Drainage of fluid and pathogenic organisms from said openings makes the job of the mortician dangerous to his health and very difficult when preparing a body for viewing by the family and friends.

A principal object of the present invention is to provide a plug for openings in cadavers which, once inserted in the opening, will seal therewith, prevent escape of fluid and is not susceptible to accidental displacement.

Another object of the invention lies in the provision of such a plug having a central bore, closed at the outer end in which cotton or other absorbent material is disposed; it being understood, that the absorbent material may be saturated with a disinfectant and tissue fixing chemicals, if desired.

A further object is to provide lateral openings into the bore to promote absorption of fluids and/or dispersal of said chemicals by the said material.

Yet another object of the invention lies in the provision of a novel arrangement of sockets which admits of application of the plug by means of an implement and thus enabling the mortician to vary the degree of insertion as required by the conditions then existing.

The foregoing and other objects and advantages of the present invention will become more apparent and meaningful during the course of the following specification when considered in association with the accompanying drawings wherein a preferred form of the invention is graphically illustrated. It is to be understood, however, that the drawings are illustrative only and are not intended to limit the scope of the invention. It should also be understood that various changes in construction may be resorted to in the course of manufacture without in any way departing from the spirit of the invention which is to be understood only in accordance with the appended claims. Furthermore, it is to be understood that while the invention is described in one particular association, it is not my intention to unnecessarily limit the applicability of the invention, but I desire to reserve to myself the claimed invention for every use of which it is now known or subsequently discovered to be susceptible.

Other advantages and features of this invention will become apparent from the more detailed description following in which like reference numerals are employed to designate similar parts in the accompanying drawings, wherein a preferred form of the invention is shown along with a modified species.

FIG. 1 is a side elevational view of my preferred plug and having the applying implement associated therewith;

FIG. 2 is a longitudinal axial section of said plug;

FIG. 3 is an end view of the base end thereof;

FIG. 4 is a lateral section taken upon the plane indicated by line 4—4 of FIG. 1; and FIG. 5 is a perspective view of the modified species.

In the several figures, the plug, in its entirety, is indicated by reference numeral 10, and has a base end 11 and a head end 12. The head end 12 is rounded or blunt for facilitating insertion. At the base end 11, the plug 10 has an annular flange 13 and spaced therefrom toward the head end 12 are other annular flanges 14, 15, 16 and 17, each successively smaller in circumference than the preceding one. Each flange 13–17, when viewed in section longitudinally of said plug, is cuniform having its acute angle or sharp edge 18 disposed outwardly. Each edge 18 of flanges 13–16 is serrated to form an annular series of pointed teeth 19.

The plug 10 has an axial bore 20 which extends from its head end 12 to a point spaced from the base end 11, and coincidentally to the bore 20 the plug 10 is quadrilaterally segmented to define radial openings 21 communicating the bore 20 exteriorly of the plug 10.

Cotton 22 or other absorbent material is disposed within the bore 20 to absorb fluids through the openings 21 and the open head end.

In the base end 11 I provide an axially parallel socket 23 and a relatively disposed angular socket 24 which are constructed and arranged to receive the mating branches 25 and 26 of an applicating implement 27 having a shank 28 and an angularly disposed handle 29.

In FIG. 5, I have shown a modified species of plug 30 which is identical in every way with the afore-described plug 10 except the annular flanges 31 are not serrated thus presenting annular sharp edges 32 and instead of quadrilateral segmentation, plug 30 is triradiately segmented. Obviously, more or less openings 21 or 33 may be provided as desired.

Having thus described my invention, I desire to secure by Letters Patent of the United States the following:

1. An appliance for inserting into an opening in a cadaver, comprising:
    a plug of impervious material having an enlarged base end and tapering toward a blunt head end;
    said plug having a central bore extending from through said head end and terminating spaced from the said base end;
    absorbent material disposed within said bore; and
    said plug having a plurality of annular sharp edged flanges each of which is circumferentially smaller than the next preceding flange from the base end to the head end.

2. The invention of claim 1 wherein: said flanges are each cuniform in section longitudinally of said plug with its acute angle edge disposed outwardly.

3. The invention of claim 2 wherein: said plug is segmented from the head end to a point spaced from the base end flange, whereby to define radial openings communicating with said bore.

4. The invention of claim 3 wherein: said flanges are each serrated at its angle edge to form pointed teeth to preclude removal of said plug from an opening once it is inserted therein.

5. The invention of claim 4 wherein:
the base end is provided with an axially parallel socket and a second socket spaced therefrom;
said second socket having its axis disposed at an angle with respect to said first-named socket to receive the mating branches of an applicator to hold said plug for insertion.

References Cited

UNITED STATES PATENTS

| | | | |
|---|---|---|---|
| 706,975 | 8/1902 | Macbeth | 128—152 |
| 2,437,381 | 3/1948 | Cullen | 27—21 |
| 2,670,738 | 3/1954 | Gibbons | 128—152 |
| 3,465,398 | 9/1969 | Rector | 27—21 |

RICHARD A. GAUDET, Primary Examiner

G. F. DUNNE, Assistant Examiner